US006560356B1

(12) United States Patent
Takahashi et al.

(10) Patent No.: US 6,560,356 B1
(45) Date of Patent: May 6, 2003

(54) COLOR GAMUT COMPRESSION METHOD AND COLOR GAMUT COMPRESSION DEVICE

(75) Inventors: Mariko Takahashi, Tokyo (JP); Masayuki Saito, Tokyo (JP); Tsuneo Sato, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/403,304

(22) PCT Filed: Apr. 17, 1998

(86) PCT No.: PCT/JP98/01785

§ 371 (c)(1),
(2), (4) Date: Oct. 20, 1999

(87) PCT Pub. No.: WO99/55074

PCT Pub. Date: Oct. 28, 1999

(51) Int. Cl.[7] .................................................. G06K 9/00
(52) U.S. Cl. .................... 382/162; 382/166; 382/167; 358/519; 358/521; 345/590
(58) Field of Search ................................. 382/162, 163, 382/166, 167, 276; 358/518, 519, 520, 521; 348/519, 520, 527, 539, 557; 345/590, 591

(56) References Cited

U.S. PATENT DOCUMENTS 5,237,409 A  8/1993  Yamaguchi 6,268,930 B1 * 7/2001  Ohta et al. ............... 358/1.9

FOREIGN PATENT DOCUMENTS

| JP | A4-101566 | 4/1992 |
| JP | A4-113773 | 4/1992 |
| JP | A4-196675 | 7/1992 |
| JP | A5-91309 | 4/1993 |
| JP | 05091309 A * | 4/1993 |
| JP | A5-191641 | 7/1993 |
| JP | 721356 | 1/1995 |
| JP | 7236069 | 9/1995 |
| JP | 998298 | 4/1997 |
| JP | 9130622 | 5/1997 |

* cited by examiner

Primary Examiner—Jayanti K. Patel
Assistant Examiner—Ali Bayat
(74) Attorney, Agent, or Firm—Birch, Stewart, Kolasch & Birch, LLP (57) ABSTRACT

Color of an information-input apparatus not in the color gamut of an information-output apparatus is converted to color inside a color gamut of the information-output apparatus and on a half-line which passes through a point which corresponds to color of an information-input apparatus taking a convergence point as an endpoint. The convergence point may any one of a point where saturation takes a value of 0, a point of an average value of a color gamut of an information-input apparatus, a point of a central value of a color gamut of an information-input apparatus, or a point of a weighted value of a color gamut of an information-input apparatus.

26 Claims, 5 Drawing Sheets

COLOR GAMUT COMPRESSION METHOD AND COLOR GAMUT COMPRESSION DEVICE

This application is the national phase under 35 U.S.C. §371 of PCT International Application No. PCT/JP98/01785 which has an International filing date of Apr. 17, 1998, which designated the United States of America.

FIELD OF THE INVENTION

The present invention relates to a color gamut compression device and method therefor which is applied to color inside a color gamut of an information-input apparatus. The color gamut compression device compresses the color gamut by converting color outside a color gamut due to an information-output apparatus into color inside a color gamut due to an information-output apparatus.

BACKGROUND OF THE INVENTION

Information apparatus such as displays, printers and scanners which process color image data have a range of color which may be input or output which is characteristic to that information apparatus. That is to say, such apparatus have a color gamut. A color gamut in information-output apparatus such as displays and printers may contain a color gamut of an information-input apparatus such as a scanner or a display. In such a case, it is possible to express the color of the image from the information-input apparatus without change in the information-output apparatus. However when a section of a color gamut in an information-output apparatus is not contained in the color gamut of an information-input apparatus, a source color inside a color gamut in the information-input apparatus can not be expressed by color outside the color gamut in the information-output apparatus without change by the information-output apparatus. Thus color which is outside the color gamut of the information-output apparatus is output after conversion to a color inside a color gamut of the information-output apparatus. That is to say, when a color gamut of an information-output apparatus is not coextensive with a color gamut of an information-input apparatus, color gamut compression processing is required.

FIG. 1 to FIG. 4 explain a conventional color gamut compression method such as disclosed for example in JP-A-9-98298.

Figure 1:
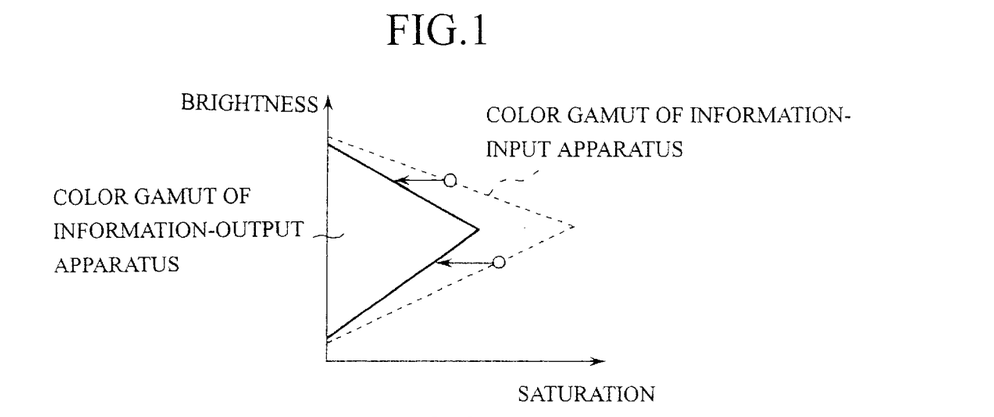
FIG. 1 explains a conventional color gamut compression method (saturation compression method.)

The color gamut compression method shown in FIG. 1 is a saturation method. In a saturation method, with respect to color inside a color gamut of an information-input apparatus, color which is outside the color gamut of the information-output apparatus is converted to color inside a color gamut of the information-output apparatus by converting only saturation and without converting the brightness.

Figure 2:
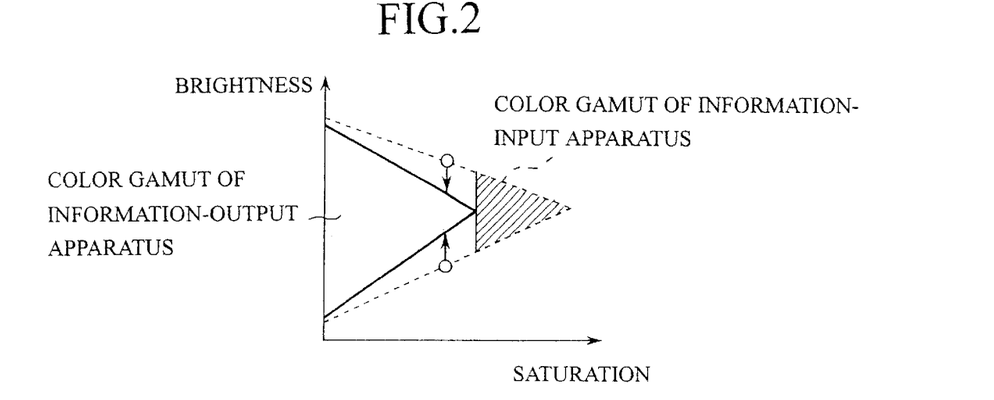
FIG. 2 explains a conventional color gamut compression method (brightness compression method.)

The color gamut compression method shown in FIG. 2 is a brightness compression method. In a brightness compression method, with respect to color inside a color gamut of an information-input apparatus, source color which is outside the color gamut of the information-output apparatus is converted to a target color inside a color gamut of the information-output apparatus by converting only brightness and without converting saturation. When a color with the same saturation as the color in the information-input apparatus is not present in the color gamut of the information-output apparatus, that is to say, when the source color of the information-input apparatus is positioned in the section of the curved line in the figure, the source color of the information-input apparatus is converted to the same fixed color of the information-output apparatus.

Figure 3:
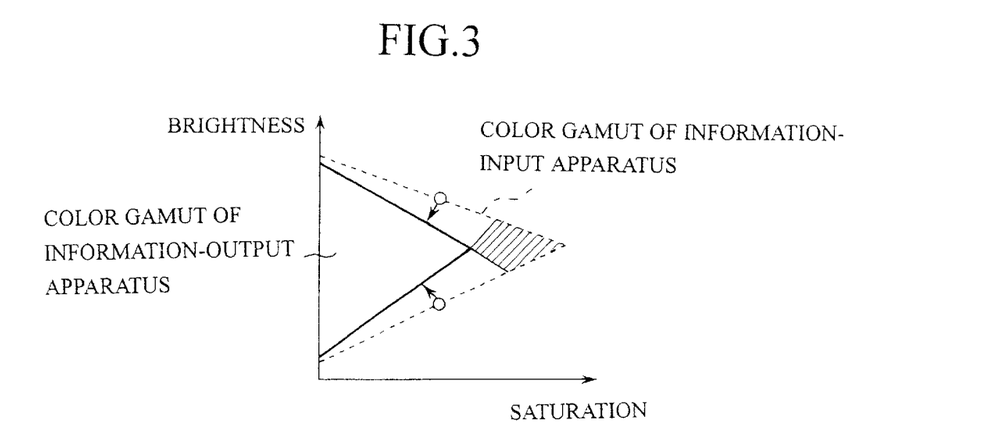
FIG. 3 explains a conventional color gamut compression method (color difference compression method.)

The color gamut compression method shown in FIG. 3 is a color difference minimization method. In a color difference minimization method, color outside the color gamut of the information-output apparatus with respect to a color inside a color gamut of an information-input apparatus is converted to a color with the smallest color difference from the color in the information-input device. Thus color in the information-input device on the curved line in the figure is all converted to the same color.

Color gamut compression processing can be performed by use of the above method. However it is possible that if employed in a saturation compression method. The tonal range in the high saturation regions will be improved to an extent, the overall effect will be an image without color definition. Although there is almost no reduction of saturation in a brightness compression method. The color in high brightness regions is converted to low brightness color and the color in low brightness region is converted to high brightness color. Thus brightness after conversion increases with increases in saturation. Furthermore since color conversion is executed in a color difference minimization method in order to minimize color differences, an image which is comparatively close to the image of the information-input apparatus is obtained by the information-output apparatus. However the section on the curved line in FIG. 3 is converted to the same color.

Figure 4:
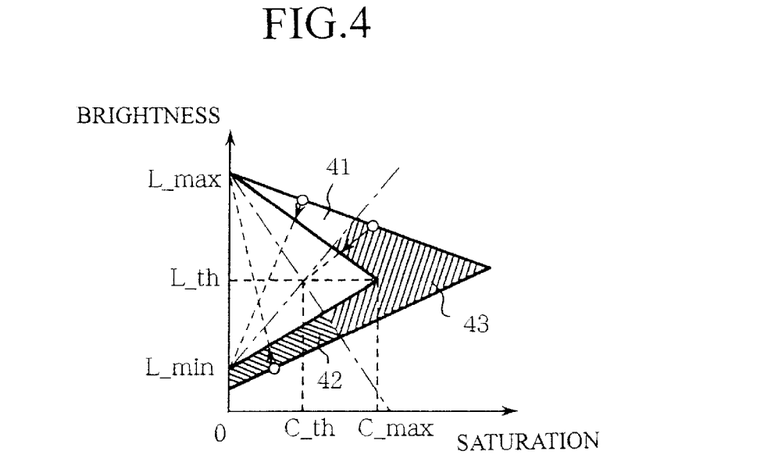
FIG. 4 explains a conventional color gamut compression method.

In this way, when using color conversion in the above method, there is a possibility that an unnatural image will be output by the information-output apparatus. A conventional color gamut compression method is proposed for example in JP-A-9-98298 as shown in FIG. 4. In this color gamut compression method, a boundary is formed by a first straight line and a second straight line. The first straight line passes through a first fixed point which has a maximum L__th brightness of a color which has a maximum saturation C__max in a color gamut of an information output device and a second point on a non-saturated axis and which has a minimum brightness L__min in an information output device. The second straight line is formed by a line passing through the first point and a third point on a non-saturated axis and which has a maximum brightness L__max in an information output device. A color gamut outside the information output device with respect to the color gamut of the information input device is divided into low brightness regions 42 and high saturation regions 43. Color in the high brightness region 41 is compressed towards the second point. Color in the low brightness region 42 is compressed towards the third point and color in the high saturation region 43 is compressed towards the first point.

With respect to the color gamut of the information-input apparatus, regions outside the color gamut of the information-output apparatus are divided into a high brightness region 41, a low brightness region 42 and a high saturation region 43. The color of the high brightness region 41 is compressed towards the second point, the color of the low brightness region 42 is compressed towards the third point and the color of the high saturation region 43 is compressed towards the first point.

Apart from the above method, a device for executing color gamut compression processing is proposed in JP-A-7-236069 and JP-A-9-130622 and a device for executing image processing is proposed in JP-A-7-21356.

However as the conventional color gamut compression method is arranged as discussed above it is necessary to determine, with respect to color inside a color gamut of the information-input apparatus whether color outside the color gamut of the information-output apparatus is positioned in any of the high brightness region 41, the low brightness region 42 or the high saturation region 43 and whether to convert such color into color in a compression direction which depends on the region. Therefore the problem has arisen that such a calculation for such a conversion is complicated. Furthermore the problem has arisen that viewpoint of the image after conversion is altered in response to the position of the first point discussed above.

The present invention is proposed to solve the above problems and has the object of providing a color gamut compression device and color gamut compression method which executes the color gamut compression processing by converting source color of an information-input apparatus to a target color inside a color gamut of the information-output apparatus while maintaining the continuity of the color. The conversion is performed by a simple calculation which does not entail a determination of the region in which the color of the information-input apparatus is positioned. Such regions originate in the division of regions outside the color gamut of the information-output apparatus. Color in the information-input apparatus which is not in the color gamut of the information-output apparatus is converted to color inside a color gamut of the information-output apparatus in the direction of a point of convergence. The point of convergence is determined to one of a point at which saturation takes the value of 0, a point of an average value of the color gamut of the information-input apparatus, a point of the central value of the color gamut of the information-input apparatus, and a point of the weighted value of the color gamut of the information-input apparatus.

SUMMARY OF THE INVENTION

In the color gamut compression method of the present invention, color in the information-input apparatus which is not in the color gamut of the information-output apparatus is converted to color inside a color gamut of the information-output apparatus in the direction of a point of convergence. The point of convergence is determined to one of a point at which saturation takes the value of 0, a point at an average value of the color gamut of the information-input apparatus, a point at a central value of the color gamut of the information-input apparatus, and a point at a weighted value of the color gamut of the information-input apparatus. The point of convergence is taken as an end point and color is converted to a color of a color gamut in that of the information-output apparatus is positioned on a half line which passes through a point which corresponds to the color of the information-input apparatus. In this way, it is possible to convert color of an information-input apparatus to color inside a color gamut of an information-output apparatus with a simple calculation while maintaining the continuity of the color. Thus color gamut compression which produces a balanced image with respect to both tone and saturation may be performed.

In the color gamut compression method of the present invention, color in the information-input apparatus which is not in the color gamut of the information-output apparatus is converted to color which corresponds to an intersection point of a half line with a contour. The half line passes through a point corresponding to color of the information-input apparatus using a point of convergence as an end point and the contour is of the color gamut of the information-input apparatus in any tone. In this way, it is possible to execute color gamut compression processing which is balanced with respect to both tone and brightness.

In the color gamut compression method of the present invention, it is sometimes the case that a plurality of intersection points exist between a contour of a color gamut of an information-output apparatus and a half line which passes through a point which corresponds to a color of an information-input apparatus using a point of convergence as an endpoint. In this case, with respect to the plurality of intersection points, color of the information-input apparatus which is not in the color gamut of the information-output apparatus is converted to color in which the value of the coordinate r in the polar coordinate system corresponds to the largest intersection point. In this way, it is possible to execute conversion with little variation in the degree of saturation.

In the color gamut compression method of the present invention, a source color of an information-input apparatus which is not in the color gamut of an information-output apparatus is converted to a target color according to three criteria. The first criterion is that a target color must reside within a predetermined angular range of the angle (θ, φ) of a source color in a polar coordinate system of a color space. The second criterion is that the target color should be one of a plurality of colors on a contour of a color gamut produced by the information-output apparatus in any tone. The third criterion is that the target color should be obtained by dividing by kH, kV and kC, respectively, the H axis component, the V axis component and the C axis component of a color which minimizes color difference ΔE given by the equation (1) below, where kH, kV and kC indicate predetermined coefficients corresponding to the H axis, the V axis and the C axis of a HVC color space, and ΔH, ΔV and ΔC indicate an amount of displacement due to conversion of a color component in the H axis, the V axis and the C axis.

$$\Delta E = \sqrt{(kH \times \Delta H^2 + kV \times \Delta V^2 + kC \times \Delta C^2)} \quad (1)$$

In this way, it is possible to convert color after conversion to color having characteristics based on the coefficients kH, kV, kC.

In the color gamut compression method according to claim 5, the coefficients kH, kV, kC are set on the basis of Formula (2) when normalized with the maximum values NH, NV, NC of the H, V, C axes of the color gamut of the information-output apparatus.

$$(kH/NH) > (10 \times kV/NV) > (10 \times kC/NC) \quad (2)$$

In this way, it is possible to convert color after conversion to color with a high subjective value based on the coefficients kH, kV, kC.

In the color gamut compression method of the present invention, an intersection point is defined by the intersection of a half line, with an endpoint at a convergence point, passing through a point which corresponds to color of an information-input apparatus with a contour of a color gamut of an information-output apparatus in any tone. With respect to a number of fixed points on a curved surface which is formed by a contour of a color gamut in an information-output apparatus in each tone, the points of intersection are calculated by interpolation based on at least three points from the smallest-value of the difference of the angle (θ, φ) with the point corresponding to the color of the information-input apparatus in a polar coordinate system (r, θ, φ). In this way, intersection points of a half line passing through a point which corresponds to color of an information-input apparatus and has a point of convergence as an endpoint with a contour of a color gamut of an information-output apparatus in any tone can be more accurately calculated.

In the color gamut compression method of the present invention, when a tone of a color of an information-input apparatus is a tone comprising any of a plurality of tones of a fixed number of standard colors, the tone is taken to be the corresponding tone from the plurality of tones and its brightness is taken to be equal to the brightness of the color with the highest saturation in a color gamut of an information-output apparatus for that tone. Furthermore a point where saturation takes a value of 0 is taken to be a convergence point. When the tone of the color in the information-input apparatus is an intermediate tone with respect to the tones of a fixed number of standard colors the point which is interpolated from the convergence point which corresponds to a tone of a fixed number of standard colors based on tones of colors of an information-input apparatus is taken to be the point of convergence. In this way, for example, the quality of the brightness of a standard color, distributed for example in low brightness, of a color from the blue group is reflected on the color after conversion. Furthermore it is possible to execute color gamut compression processing with higher continuity in the direction of tone.

In the color gamut compression method of the present invention, a vector which corresponds to a color in the information-input apparatus is defined as P and a vector which corresponds to a convergence point is defined as Po. A vector which corresponds to the intersection point of the half line which passes through a point which corresponds to the vector P taking vector P as an endpoint and a curved surface which is formed on a contour of a color gamut in an information-output apparatus in each tone is taken as Ps. The vector which corresponds to the intersection point of the half line and the curved surface which is formed on the contour of the color gamut of an information-input apparatus in each tone is taken to be Pt. When the above conditions exist, the color of a information-input apparatus which corresponds to the vector P is converted to a color which corresponds to the vector Pc by Formula (3) when k has a value which is a fixed constant greater than 0.

$Pc=Po+(P-Po)\times|Ps-Po|/|Pt-Po|\times k$ (when $k\times|P-Po|\leq|Ps-Po|$)

$Pc=Ps$ (when $k\times|P-Po|>|Ps-Po|$) \hfill (3)

In this way, conversion proximate to the contour with respect to colors in the proximity of the contour in the color gamut of the information-output apparatus can be smoothly continued. The image after conversion thus becomes more natural.

In the color gamut compression method of the present invention, a source color of information-input apparatus which is not in the color gamut of an information-output apparatus is converted to a target color inside a color gamut of an information-output apparatus and which is on a half line which passes a point corresponding to a color of an information-input apparatus. A convergence point is defined from one of a point at which saturation takes the value of 0, a point of an average value of the color gamut of a fixed tone in the information-input apparatus, a point of the central value of the color gamut of a fixed tone of the information-input apparatus, and a point of the weighted value of the color gamut of a fixed tone of the information-input apparatus. In this way, a simple calculation may be performed without impairing the continuity of the color of the information-input apparatus.

Thus it is possible to execute balanced color gamut compression processing with respect to tone and saturation and to convert an information-input apparatus to a color inside a color gamut of an information-output apparatus while maintaining continuity.

In the color gamut compression method of the present invention, a color of an information-input apparatus which is not in the color gamut of an information-output apparatus is converted to a color corresponding to the intersection point of a half line which corresponds to a color or an information-input apparatus and has an endpoint at a point of convergence and a contour of a color gamut of an information-output apparatus in any tone. In this way, it is possible to perform balanced color gamut compression processing with respect to tone and brightness.

In the color gamut compression method of the present invention, a source color of an information-input apparatus which is not in the color gamut of an information-output apparatus is converted to a target color according to three criteria. The first criterion is that a target color must reside within a predetermined angular range of the angle (θ, ϕ) of a source color in a polar coordinate system (r, θ, ϕ) of a color space. The second criterion is that the target color should be one of a plurality of colors on a contour of a color gamut produced by the information-output apparatus in any tone. The third criterion is that the target color should be obtained by dividing by kH, kV and kC, respectively, the H axis component, the V axis component and the C axis component of a color which minimizes color difference ΔE given by the equation (4) below, where kH, kV and kC indicate predetermined coefficients corresponding to the H axis, the V axis and the C axis of a HVC color space, and ΔH, ΔV and ΔC indicate an amount of displacement due to conversion of a color component in the H axis, the V axis and the C axis.

$\Delta E=\sqrt{(kH\times\Delta H^2+kV\times\Delta V^2+kC\times\Delta C^2)}$ \hfill (4)

In this way, it is possible to convert a color after conversion to a color having characteristics based on the coefficients kH, kV and kC.

In the color gamut compression method of the present invention, when a tone of a color of an information-input apparatus is any one of a number of tones of a fixed number of standard colors, the tone is taken to be the corresponding tone from the plurality of tones and its brightness is taken to be equal to the brightness of the color with the highest saturation in a color gamut of an information-output apparatus for that tone. Furthermore a point where saturation takes a value of 0 is taken as an endpoint. When the tone of the color in the information-input apparatus is an intermediate tone with respect to the tones of a fixed number of standard colors, the point which is interpolated from the convergence point which corresponds to a tone of a fixed number of standard colors based on tones of colors of an information-input apparatus is taken to be the point of convergence. In this way, for example, the quality of the brightness of a standard color, distributed for example in low brightness, of a color from the blue group is reflected on the color after conversion. Furthermore it is possible to execute color gamut compression processing with higher continuity in the direction of tone.

In the color gamut compression method of the present invention, a vector which corresponds to a color in the information-input apparatus is defined as P and a vector which corresponds to a convergence point is defined as Po. A vector which corresponds to the intersection point of the half line which passes through a point which corresponds to the vector P taking vector Po as an endpoint and a curved surface which is formed on a contour of a color gamut in an information-output apparatus in each tone is taken as Ps. The vector which corresponds to the intersection point of the half line and the curved surface which is formed on the contour of the color gamut of an information-input apparatus in each tone is taken to be Pt. When the above conditions hold, the color of an information-input apparatus which corresponds to the vector P is converted to a color which corresponds to the vector Pc by Formula (5) when k has a value which is a fixed constant greater than 0.

$$Pc=Po+(P-Po)\times|Ps-Po|/|Pt-Po|\times k$$

(when $k\times|P-Po|\leq|Ps-Po|$)

$$Pc=Ps$$

(when $k\times|P-Po|>|Ps-Po|$) (5)

In this way, conversion proximate to the contour with respect to colors in the proximity of the contour in the color gamut of the information-output apparatus can be smoothly continued. The image after conversion thus becomes more natural.

DESCRIPTION OF THE PREFERRED EMBODIMENTS

In order to explain the invention in greater detail, the preferred embodiments of the invention will be discussed below with reference to the accompanying figures.
Embodiment 1

Figure 5:
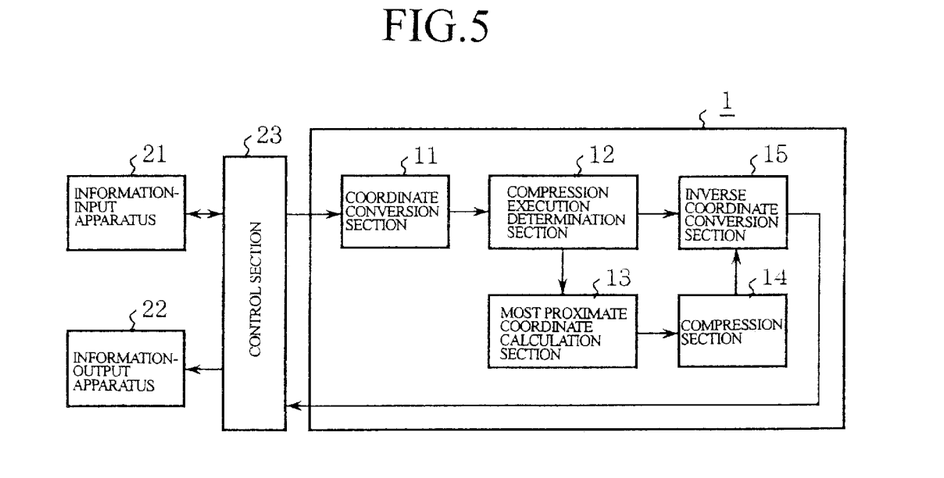
FIG. 5 is a block diagram showing the structure of a color gamut compression device according to a first embodiment of the present invention.

FIG. 5 is a block diagram showing the structure of a color gamut compression device according to a first embodiment of the present invention. In the figure, reference numeral 1 denotes a color gamut compression device. The color gamut compression device 1 is supplied with color image data input or output from an information-input apparatus 21 such as a display or scanner for example. With respect to the color in the image data, the color gamut compression device 1 converts color outside the color gamut of the information-output apparatus such as a printer or display for example. Then the color gamut compression device 1 outputs image data after conversion to a control device.

In the color gamut compression device 1, reference number 11 denotes a corrdinate conversion section which converts the color mentioned above in a fixed coordinate system in the color image dasta supplied from the cotnrol device 23 into the color mentioned above with the polar coordinate system (r, θ, φ). 12 is a compresion execution determination section which determines whether or not to execute color gamut compression processing of color image data based on whether or not color in the color image data supplied from the coordinate conversion section 11 is positioned in the color gamut of the information-output apparatus 22. When color gamut compression processing is performed on color image data, color image data is output to the most proximate coordinate calculation section 13. When color gamut compression processing is not performed on color image data, color image data is output to the inverse coordinate calculation section 15.

13 is a most proximate coordinate calculation section which calculates coordinates (r, θ, φ) on a polar coordinate system of an intersection point. Based on color information in color image data supplied from the compression execution determination section 12, a point where saturation takes the value of 0 is taken to be a point of convergence. Using the point of convergence as an endpoint, the coordinates (r, θ, φ) of the intersection point are calculated of a half line which passes through a point corresponding to a color in the image data and a contour of a color gamut in an information-output apparatus 22 in any tone. 14 is a compression section (compression means) which converts color in color image data to color corresponding to coordinates calculated by the proximate coordinate calculation section 13.

15 is an inverse coordinate conversion section which inversely converts color in an polar coordinate system of color image data supplied from the compression execution determination section 12 and color in a polar coordinate system after conversion by the compression section 14 to color in an original coordinate system. Color image data is output after inversely converting the color to the control device 23.

The control device 23, not particularly containing the color gamut compression device, transfer of image data between the information-input apparatus and the information-output apparatus.

The operation of the invention will be discussed below.

Figure 6:
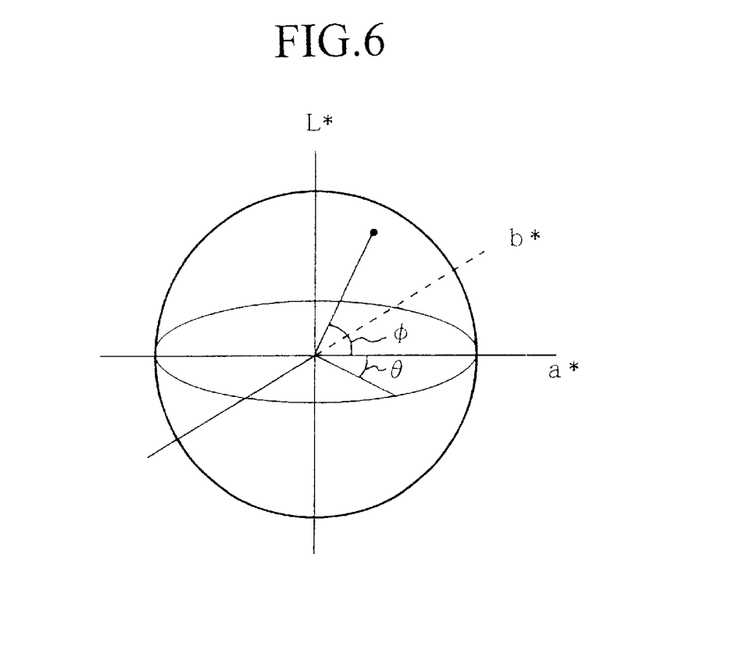
FIG. 6 explains coordinate conversion to polar coordinates.
Figure 7:
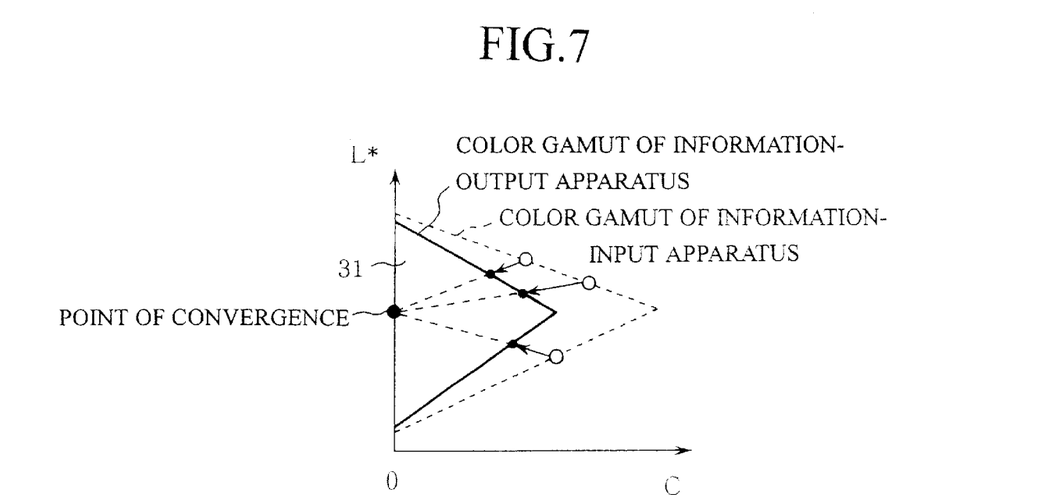
FIG. 7 explains conversion of color to image data.

FIG. 6 explains the coordinate conversion of polar coordinates. FIG. 7 explains the conversion of color by the color gamut compression device according to a first embodiment of the invention.

The coordinate conversion section 11 in the color gamut compression section 1 is supplied with color image data by the control device 23. Color in a fixed coordinate system in the image data as explained above is converted to color in an polar coordinate system (r, θ, φ) and image data after coordinate conversion is output to the compression execution determination section 12.

When a color space common to the information-input apparatus and the information-output apparatus is in the form for example L*a*b*, as shown in FIG. 6, color expressed by (L*, a*, b*) in the orthogonal coordinate system of the color space L*a*b* is converted to color expressed by (r, θ, φ) in the polar coordinate system by Formula (6).

$$r = \sqrt{(L^{*2} + a^{*2} + b^{*2})}$$

$$\theta = \tan^{-1}(a^*/b^*)$$

$$\phi = \tan^{-1}(L^*/\sqrt{(a^{*2}/b^{*2})}) \quad (6)$$

The compression execution determination section 12 is supplied with color image data by the coordinate conversion section 11. The compression execution determination section 12 determines whether or not color in such image data is positioned in the color gamut of the information-output apparatus 22 in tones of color in the image data. When it is determined that color in such image data is positioned in the color gamut of the information-output apparatus 22, it is determined that color gamut compression processing will not be performed on the image data and the image data is output to the inverse coordinate conversion section 15.

When it is determined that color in such image data is not positioned in the color gamut of the information-output apparatus 22, the compression execution determination section 12 determines that color gamut compression processing will be performed on the color data and the image data is output to the most proximate coordinate calculation section 13.

When a color space common to the information-input apparatus 21 and the information-output apparatus 22 is in the form for example L*a*b*, for example, firstly the compression execution determination section 12 operates based on coordinate conversion formula (7) on the horizontal plane of brightness (L*)—saturation (C) from the polar coordinate system (r, θ, φ).

$$L^* = r \times \sin \phi$$

$$C = r \times \cos \phi = \sqrt{(a^{*2} + b^{*2})} \quad (7)$$

With respect to the color gamut data in the information-output apparatus 22 in which each tone H is prerecorded, the compression execution determination section 12 determines whether or not color in the supplied image data is in the color gamut of the information-output apparatus 22 in that tone based on color gamut data corresponding to a tone H (=0) of a color in the supplied image data.

As explained above, after executing coordinate conversion to the on the horizontal plane brightness—saturation from the polar coordinate system, it is determined whether or not color in the supplied image data is in the color gamut of the information-output apparatus 22. However in the polar coordinate system, the invention may be adapted to directly determine whether or not the color in the supplied image data is in the color gamut of the information-output apparatus 22.

The color gamut of the input and information-output apparatus 21, 22 that is to say, the range of color which can be input or output, is pre-measured using spectrophotometric colorimetry or the like. Data for the color gamut which is expressed between the common color spaces of the input and information-output apparatus 21, 22 is prestored in the color gamut compression device.

When image data is supplied from the compression execution determination section 12, the most proximate coordinate calculation section 13 calculates the intersection point (r, θ, φ) of the half line which passes through the color in the image data with a point of convergence as an endpoint and the contour of the color gamut 31 of the information-output apparatus 22 in any tone as shown in FIG. 7. The calculation is based on color gamut data for the information-output apparatus 22 in a color in the image data and a tone H of a color in the image data. The coordinates are output to the compression section 14 based on image data. When there are a plurality of points of intersection of the half line and the contour of the color gamut in the information-output apparatus 22. The most proximate coordinate calculation section 13 selects the intersection point in which the coordinate value r of the polar coordinate system is greatest from the points of intersection and outputs the coordinates of that point to the compression section 14 based on the image data.

The compression section 14 converts color of the image data to color which corresponds to coordinates which are supplied by the most proximate coordinate calculation section 13 and outputs the image data after conversion of the color to the inverse coordinate conversion section 15. The inverse coordinate conversion section 15 inverse converts the color in the polar coordinate system of the color image data supplied by the compression execution determination section 12 or the compression section 14 to a color in the original coordinate system. The color image data after inverse conversion is output to the control device 23.

As shown above, according to the first embodiment, since all colors of the information-input apparatus which are not in a color gamut of an information-output apparatus 22 are transferred towards a single point of convergence, color continuity is not impaired and it is possible to convert a color of an information-input apparatus 21 to a color inside a color gamut of an information-output apparatus 22. The calculation is simplified as it is not necessary to determine the region in which the color of the information-input apparatus 21 which originates in a division of regions outside the color gamut of the information-output apparatus 22 is positioned. Thus it is possible to convert color in the information-input apparatus 21 to color inside a color gamut of the information-output apparatus 22.

Figure 8:
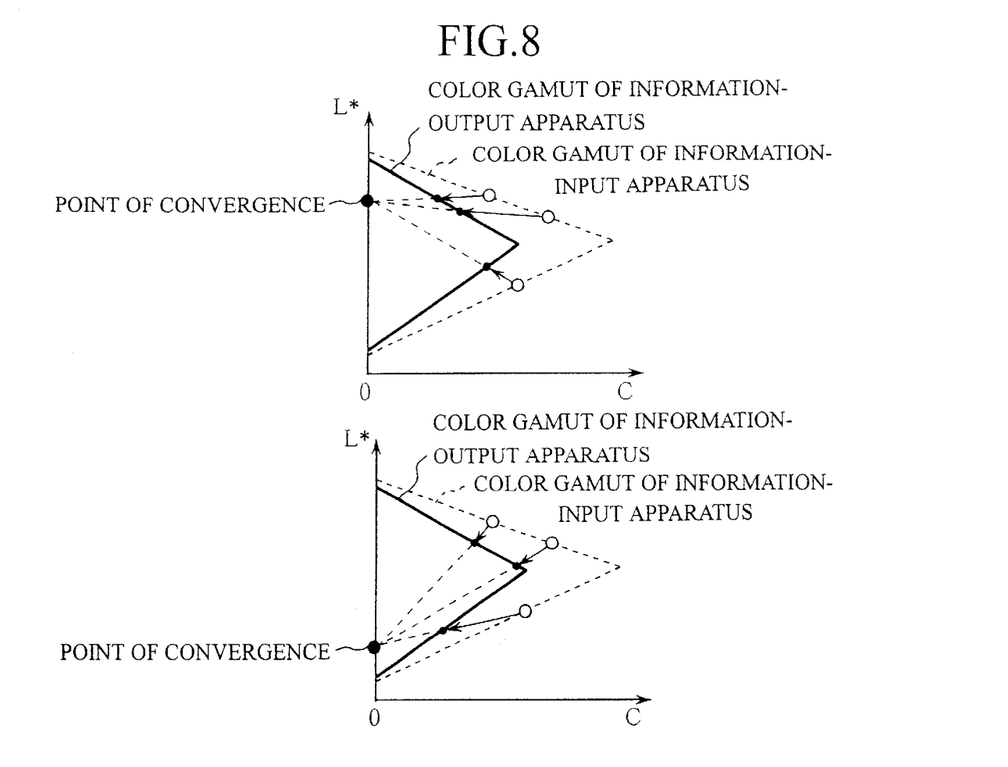
FIG. 8 shows an example of a set position of a point of convergence.

The point of convergence as shown in FIG. 7 is set to have a center of brightness. However as shown in FIG. 8, the point of convergence may be set from central brightness to higher or lower brightness. Furthermore in the first embodiment, a fixed point which has a saturation with a value of 0 acts as the point of convergence. However apart from this, a point with an average value of the color gamut of the information-input apparatus 21, a point with a central value of the color gamut of the information-input apparatus 21 or a point with a weighted value of the color gamut of the information-input apparatus 21 may be also set as the point of convergence.

Herein an average value of the color gamut is a coordinate value which is obtained by respectively dividing the sums of each component of colors at sampling points by the number of sampling points where a fixed number of sampling points exist in an expressible color space of an information-input apparatus 21 in a fixed color space. A central value of a color gamut is a median value of an expressible color space of an information-input apparatus 21 with respect to each axial component of the color space. A weighted value of the color gamut is the coordinate value obtained by dividing a weighted sum of each component of a color at a sampling point by the number of sampling points where a fixed number of sampling points exist in an expressible color space of an information-input apparatus 21 in a fixed color space.

Embodiment 2

Figure 9:
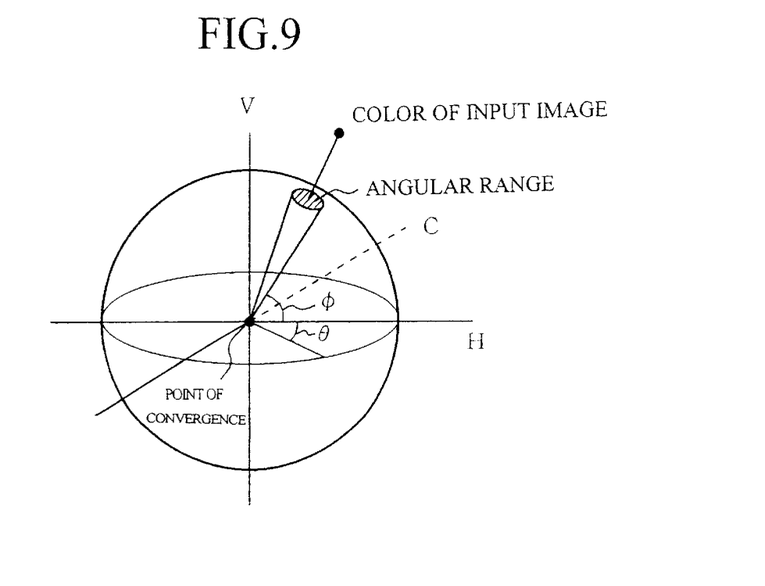
FIG. 9 explains the conversion of color by a color gamut compression device according, to a second embodiment of the present invention.

The color gamut compression device of the second embodiment of the present invention is the same of the first embodiment as regards components other than the most proximate coordinate calculation section 13. Thus only the operation of the most proximate coordinate calculation section 13 will be explained. FIG. 9 explains the conversion of color of the color gamut conversion device in a second embodiment of the present invention.

According to a second embodiment as shown in FIG. 9, when the common color space of the information input and output apparatus 21, 22 is an HVC space, the most proximate coordinate calculation section 13 of the color gamut compression device selects a plurality of colors on a color gamut contour of an information output device 22 in any tone and in an angle range of ±(k/π) (for example k is a constant taking any value of 1 to 10 inclusive) of respectively the θ and φ axes from an angle (θ, φ) of a color in image data supplied from the compression execution determination section 12. The angle (θ, φ) is in the polar coordinates (r, θ, φ) of a color space. With respect to selected colors, kH, kV and kC are taken to be fixed coordinates of the H, V and C axes and ΔH, ΔV, ΔC are taken to be the amount of displacement due to conversion of the H, V and C axial components. Thus a color which has a minimum color difference value ΔE from Formula (8) below is selected. The color of the image data is converted to a color in which the H, V and C axial components of the color are divided by respective coefficients kH, kV and kC.

$$\Delta E = \sqrt{(kH \times \Delta H^2 + kV \times \Delta V^2 + kC \times \Delta C^2)} \quad (8)$$

The coefficients kH, kV and kC may be set based on the relationship of Formula 9 when normalized by the maximum values NH, NV, NC of the H axis, the V axis and the C axis in the color gamut of the information-output apparatus 22.

$$(kH/NH) > (10 \times kV/NV) > (10 \times kC/NC) \quad (9)$$

The relationship expressed in Formula 9 is based on experiments via subjective evaluation. That is to say, a plurality of sample colors of equivalent tone, a plurality of sample colors of equivalent brightness, a plurality of sample colors of equivalent saturation are prepared. Original colors with a color difference of 0 with respect to the sample colors are prepared. Next using a method of pair comparison or a gradation category method, a subjective distance between the original colors and each sample color is measured based on the subjective impression of a viewer in the experiment. Thus Formula 9 leads through a relationship in which the image after conversion results in a natural image.

As shown above, according to the second embodiment, color of an information-input apparatus 21 which is not in the color gamut of an information-output apparatus 22 is converted to color in which a weighted color difference based on the coefficients kH, kV, kC which correspond to each axial component of the HVC color space is a minimum. Thus it is possible to convert color after conversion to color with a high subjective value for example based on the coefficients kH, kV, kC.

Embodiment 3

Figure 10:
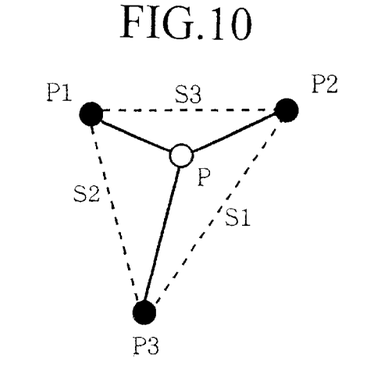
FIG. 10 shows an example of a sample point on a curved face formed by a contour of a color gamut of an information-output apparatus.

The color gamut compression device according to a third embodiment of the present invention is the same as the first embodiment above with the exception of the most proximate coordinate calculation section 13. Thus only the operation of the most proximate coordinate calculation section 13 will be explained. FIG. 10 explains an example of a sample point on a curved surface which is formed on a contour of a color gamut in a second embodiment of the present invention.

The most proximate coordinate calculation section 13 in a color gamut compression device according to a third embodiment selects at least three points from a direction in which the angular difference (θ, φ) with a point which corresponds to a color in the information-input apparatus 21 is a minimum in the polar coordinate system (r, θ, φ) of the color space. The three points are selected from a fixed number of sample points on a curved surface formed on a contour of a color gamut in an information-output apparatus 22 in each tone. The intersection points of a half line and a contour is calculated. The half line passes through a point which corresponds to a color of an information-input apparatus 21 and has a point of convergence as an endpoint. The contour is of a color gamut of an information-output apparatus 22 in any tone. These points are calculated by interpolation based on an angle (θ, φ) of a color in an information-input apparatus 21.

For example, when an angle (θ, φ) of a point PO which corresponds to a color in supplied image data is in a range of an angle (θ, φ) which corresponds to a region of a triangle which is formed by three sample points P1, P2, P3 as shown in FIG. 10, the most proximate coordinate calculation section 13 calculates coordinates (r, θ, φ) of a point of intersection of a half line which passes through a point of a color in image data with the endpoint being a point of convergence and a contour of a color gamut in an information-output apparatus 22 in any tone. The coordinates are calculated from the coordinates of sample points based on Formula 10.

$$Wi = Si / \Sigma_i Si \quad (10)$$

$$Q = \Sigma_i Wi\, Pi$$

However Si is taken to be the area of a triangle formed from the vector P and two points of the apex points of the triangle P1, P2, P3 omitting Pi. Pi is a vector which corresponds to the point Pi. Q is the vector which corresponds to the intersection point.

A shape formed from the sample points in such a way is not limited to a triangle and may be another polygon.

As shown above, according to a third embodiment, it is possible to more accurately calculate coordinates (r, θ, φ) of an intersection point of a half line, which passes through a point of a color in image data when an endpoint is a point of convergence, and a contour of a color gamut of an information-output apparatus 22 in any tone.

Embodiment 4

Figure 11:
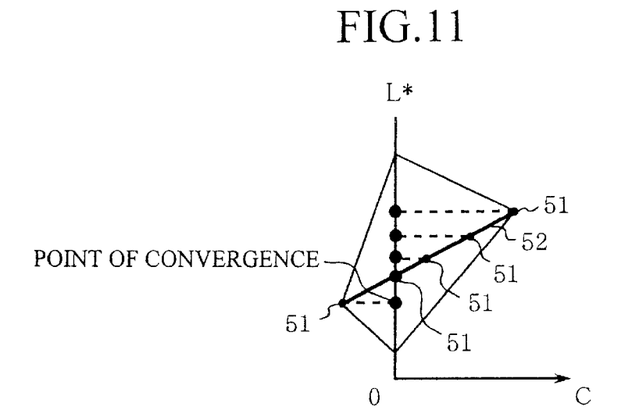
FIG. 11 explains the process by which brightness of a point of convergence which corresponds to an intermediate tone is set by interpolation in a fourth embodiment of the present invention.

Although a point of convergence was fixed in the first embodiment, the fourth embodiment is adapted to convert the brightness of a point of convergence in response to a tone of a color in image data of an information-input apparatus 21. FIG. 11 explains the process of setting the brightness of a point of convergence which corresponds to an intermediate tone based on interpolation in embodiment 4.

For example, tones of each of the standard colors red, green, blue, cyanogen, magenta and yellow have a tone which is a tone of a color in image data, have a brightness which is the same as the brightness of the color with the highest saturation in the color gamut of the information-output apparatus 22 for that tone and are set to a point of convergence which corresponds to a tone with a saturation of 0. In addition, when the tone of a color in image data is an intermediate tone with respect to tones of the standard colors above, a point interpolated from the point of convergence corresponding to the tone of the standard color is set to a point of convergence corresponding to the intermediate color based on that tone. Thus as shown in FIG. 1, a convergence point is first set corresponding to the color with the highest saturation in a color gamut in each tone of the standard color. In addition, the brightness of points of convergence which correspond to an intermediate tone of tones for standard colors is set to a value which is interpolated along a line 52 which depends on the value of the tone.

As shown above, according to a fourth embodiment of the present invention, the brightness of a point of convergence which corresponds to a tone of a standard color is made equal to the brightness of the point with the highest saturation in a color gamut in that tone. Also points of convergence which corresponds to respective tones are set to points which are interpolated from points of convergence which correspond to the tone of standard colors depending on the tone of a color in image data from an information-input apparatus 21. For example, with respect to colors in the blue range, the quality of brightness of standard colors which are distributed in low brightness is reflected in the color after conversion. Furthermore it is possible to perform color gamut processing with higher reliability with respect to the tonal direction.

Embodiment 5

Figure 12:
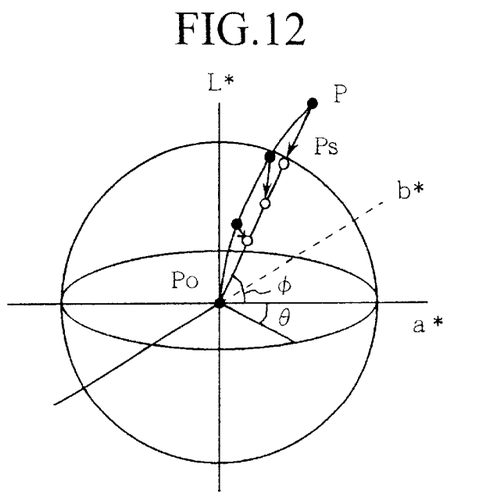
FIG. 12 shows an example of conversion of color by a color gamut compression device according to a fifth embodiment of the present invention.

In a color gamut compression device according to a fifth embodiment of the present invention, color inside a color gamut of an information-output apparatus 22 may be transferred in the direction of a point of convergence as well as colors in the color gamut of an information-output apparatus 22. FIG. 12 shows an example of conversion of a color inside a color gamut compression device according to a fifth embodiment of the present invention.

That is to say, in embodiment 5, the output of a coordinate conversion section 11 is supplied directly to a most proximate coordinate calculation section 13. The most proximate coordinate calculation section 13 calculates a first intersection point of a half line which passes through a point which corresponds to a vector P taking a point which corresponds to a vector Po to be an endpoint, with a curved surface which is formed by a contour of a color gamut in an information-input apparatus 22 in each tone. The most proximate coordinate calculation section 13 calculates a second intersection point of the half line with a curved surface which is formed by the contour of a color gamut in an information-input apparatus 21 in each tone. The vector which corresponds to a color coordinate converted by the coordinate conversion section 11 supplied to the information-input device 21 is taken to be P. The vector corresponding to the point of convergence is taken to be Po.

Then the compression section 13 converts color in an information-input apparatus 21 which corresponds to a vector P to color which corresponds to a vector Pc in Formula (11) when k is a fixed constant with a value greater than 0. A vector which corresponds to a first point of intersection is taken to be Ps and a vector which corresponds to a second point of intersection is taken to be Pt.

$Pc = Po + (P-Po) \times |Ps-Po|/|Pt-Po| \times k$ (when $k \times |P-Po| \leq |Ps-Po|$)

$PC = Ps$ (when $k \times |P-P0| > |Ps-Po|$)  (11)

Based on Formula (11), when the color in image data supplied from the information-input apparatus 21 is converted, the color is continuously converted along the half line as shown in FIG. 12.

As shown above, according to the fifth embodiment, color inside a color gamut of an information-output apparatus 22 may be transferred in the direction of a point of convergence as well as color in an information-input apparatus 21 which is not in the color gamut of an information-output apparatus 22. Thus the effect is obtained that color near the contour of a color gamut in an information-output apparatus 22 may be smoothly converted and the image after conversion is more natural.

In embodiments 1 to 5 above, L*a*b* color spaces and HVC color spaces were taken as examples of a color space used in an input and information-output apparatus 21, 22. However the color space is not limited to L*a*b* color spaces and HVC color spaces and color spaces such as RGB color spaces, L*u*v* color spaces, XYS color spaces or LCH color spaces may be used.

Industrial Application

As shown above, a color gamut compression device and method therefor according to the present invention is adapted to perform color gamut compression processing by converting a source color from an information-input apparatus to a target color inside a color gamut of an information-output apparatus while maintaining color continuity with a simple calculation. The conversion does not entail the determination of the region in which a color in the information-input apparatus is placed which originates the division of the region outside the color gamut of the information-output apparatus.

What is claimed is:

1. A color gamut compression method comprising:
converting color inside a color gamut of an information-input apparatus, said first color of the information-input apparatus outside a color gamut of an information-output apparatus, to color inside the color gamut of the information-output apparatus,
wherein one of a point having a saturation value of 0, a point having an average value of the color gamut in said information-input apparatus, a point having a central value of the color gamut in the information-input apparatus, and a point having a weighted value in said information-input apparatus is taken to be a point of convergence, said point of convergence is taken to be an endpoint of a line, and wherein color in the information-input apparatus which is not in the color gamut in the information-output apparatus is converted to color on said line which passes through a point which corresponds to a color in said information-input apparatus and which is in the color gamut in the information-output apparatus.

2. A color gamut compression method according to claim 1, wherein color in said information-input apparatus which is not in the color gamut in the information-output apparatus is converted to color which corresponds to an intersection point of a line which passes through a point with a contour of the color gamut in the information-output apparatus in any tone, said point corresponding to a color in said information-input apparatus and being an endpoint acting as a point of convergence.

3. A color gamut compression method according to claim 2, wherein color in said information-input apparatus which is not in the color gamut in the information-output apparatus is converted to color which corresponds to an intersection point, said intersection point being one of a plurality of intersection points, in which a coordinate value r takes a maximum value in an polar coordinate system, when the plurality of intersection points exist, said intersection points being defined by the intersection of a line with a contour of the color gamut in said information-output apparatus said line having a point of convergence acting as an endpoint and passing through a point corresponding to a color in said information-input apparatus.

4. A color gamut compression method according to claim 1, wherein color in said information-input apparatus which is not in the color gamut in the information-output apparatus is converted according to three criteria, wherein a first criterion is that a target color must reside within a predetermined angular range of an angle (θ, φ) of a source color in a polar coordinate system of a color space, a second criterion is that the target color should be one of a plurality of colors on a contour of the color gamut produced by the information-output apparatus in any tone, and a third criterion is that the target color should be obtained by dividing by kH, kV and kc, respectively, a H axis component, a V axis component and a C axis component of a color which minimizes color difference ΔE given by Formula (1) below, wherein kH, kV and kC indicate predetermined coefficients corresponding to the H axis, the V axis and the C axis of a HVC color space, and ΔH, ΔV and ΔC indicate an amount of displacement due to conversion of a color component in the H axis, the V axis and the C axis $$\Delta E = \sqrt{(kH \times \Delta H^2 + kV \times \Delta V^2 + kC \times \Delta C^2)}. \tag{1}$$

5. A color gamut compression method according to claim 4, wherein kH, kV and kC are set based on the relationship of Formula (2) when the maximum values NH, NV, NC of said H axis, the V axis and the C axis of the color gamut in the information-output apparatus are normalized $$(kH/NH) > (10 \times kV/NV) > (10 \times kC/NC). \tag{2}$$

6. A color gamut compression method according to claim 1, wherein an intersection point of a line with a contour in the information-output apparatus in any tone is calculated by interpolation based on at least three points from a smallest value of a difference of an angle (φ, Δ) with the point corresponding to the color of the information-input apparatus in a polar coordinate system (r, φ, Δ) of a color space for a number of fixed points on a curved surface which is formed by a contour of a color gamut in the information-output apparatus in each tone, said line passing through a point corresponding to a color in an information-input apparatus and having the point of convergence as the endpoint.

7. A color gamut compression method according to claim 1, wherein when a tone of a color of an information-input apparatus is a tone comprising any of a plurality of tones of a fixed number of standard colors, said tone is taken to be a corresponding tone from said plurality of tones and a brightness of said tone is taken to be equal to a brightness of a color with the highest saturation in the color gamut of the information-output apparatus for that tone, a convergence point is taken to be a point where saturation takes a value of 0, and further wherein when a tone of a color in said information-input apparatus is an intermediate tone with respect to tones of a fixed number of standard colors, a point which is interpolated from a convergence point which corresponds to a tone of a fixed number of standard colors based on tones of colors of an information-input apparatus is taken to be the point of convergence.

8. A color gamut compression method according to claim 1, wherein a vector which corresponds to a color in the information-input apparatus is defined as P, a vector which corresponds to a convergence point is defined as Po, a vector which corresponds to the intersection point of the line which passes through a point which corresponds to the vector P taking vector P as an endpoint and a curved surface which is formed on a contour of the color gamut in the information-output apparatus in each tone is taken as Ps, a vector which corresponds to the intersection point of the line and the curved surface which is formed on the contour of the color gamut of the information-input apparatus in each tone is taken to be Pt, when the above conditions exist, a color of the information-input apparatus which corresponds to the vector P is converted to a color which corresponds to vector Pc by Formula (3) when k has a value which is a fixed constant greater than 0

$$Pc = Po + (P-Po) \times |Ps-Po|/|Pt-Po| \times k$$

(when $k \times |P-Po| \leq |Ps-Po|$)

$$Pc = Ps$$

(when $k \times |P-Po| > |Ps-Po|$). \tag{3}

9. A color gamut compression method according to claim 1, wherein a conversion means is provided which converts color in the information-input apparatus which is not in the color gamut of the information-output apparatus to color inside the color gamut of the information-output apparatus and which is on a line passing through a point corresponding to a color of the information-input apparatus taking a point of convergence as an endpoint, said point of convergence is determined to one of a point at which saturation takes the value of 0, a point at an average value of the color gamut of the information-input apparatus, a point at a central value of the color gamut of the information-input apparatus, and a point at a weighted value of the color gamut of the information-input apparatus.

10. A color gamut compression method according to claim 9, wherein said conversion means converts color of the information-input apparatus which is not in the color gamut of the information-output apparatus to color which corresponds to an intersection point of a line and a contour of a color gamut in the information-output apparatus in any tone, said line passing through a point which corresponds to a color of an information-input apparatus taking the point of convergence as the endpoint.

11. A color gamut compression method according to claim 9, wherein a source color of an information-input apparatus which is not in the color gamut of an information-output apparatus is converted to a target color according to three criteria, the first criterion being that a target color must reside within a predetermined angular range of the angle (θ, φ) of a source color in a polar coordinate system (r, θ, φ) of a color space, the second criterion being that the target color should be one of a plurality of colors on a contour of the color gamut produced by the information-output apparatus in any tone, the third criterion being that the target color should be obtained by dividing by kH, kV and kC, respectively, the H axis component, the V axis component and the C axis component of a color which minimizes color difference ΔE given by the Formula (4) below, where kH, kV and kC indicate predetermined coefficients corresponding to the H axis, the V axis and the C axis of a HVC color space, and ΔH, ΔV and ΔC indicate an amount of displacement due to conversion of a color component in the H axis, the V axis and the C axis $$\Delta E = \sqrt{(kH \times \Delta H^2 + kV \times \Delta V^2 + kC \times \Delta C^2)}. \tag{4}$$

12. A color gamut compression method according to claim 9, wherein when a tone of a color of the information-input apparatus comprises any of a plurality of tones of a fixed number of standard colors, said tone is taken to be a corresponding tone from said plurality of tones and a brightness of said tone is taken to be equal to a brightness of a color with the highest saturation in a color gamut of an information-output apparatus for that tone, a convergence point is taken to be a point where saturation takes a value of 0, and further wherein when said tone is an intermediate tone with respect to the tones of a fixed number of standard colors, a point which is interpolated from a convergence point which corresponds to a tone of a fixed number of standard colors based on tones of colors of information-input apparatus is taken to be the point of convergence.

13. A color gamut compression method according to claim 9, wherein a vector which corresponds to a color in the information-input apparatus is defined as P, a vector which corresponds to a convergence point is defined as Po, a vector which corresponds to the intersection point of the line which passes through a point which corresponds to the vector P taking vector Po as an endpoint and a curved surface which is formed on a contour of the color gamut in the information-output apparatus in each tone is taken as Ps, a vector which corresponds to the intersection point of the line and the curved surface which is formed on the contour of the color gamut of an information-input apparatus in each tone is taken to be Pt, when the above conditions hold, the color of the information-input apparatus which corresponds to the vector P is converted to a color which corresponds to the vector PC by Formula (5) below when k has a value which is a fixed constant greater than 0

$Pc = Po + (P-Po) \times |Ps-Po|/|Pt-Po| \times k$ (when $k \times |P-Po| \leq |Ps-Po|$)

$Pc = Ps$ (when $k \times |P-Po| > |Ps-Po|$). (5)

14. A color gamut compression apparatus comprising:
means for converting color inside a color gamut of an input apparatus to color inside a color gamut of an output apparatus, wherein the color of the input apparatus is outside the color gamut of the output apparatus, by determining a point of convergence, wherein said point of convergence is at least one of a point having a saturation value of 0, a point having an average value of the color gamut in said input apparatus, a point having a central value of the color gamut in the input apparatus, and a point having a weighted value in said input apparatus, and
wherein said point of convergence is an endpoint of a line, which passes through a point which corresponds to the color in said input apparatus and which is in the color gamut of the output apparatus and wherein the color in the input apparatus is converted to a color on said line which is in the color gamut of the output apparatus.

15. A color gamut compression apparatus according to claim 14, wherein color in said information-input apparatus which is not in the color gamut in the information-output apparatus is converted to color which corresponds to an intersection point of a line which passes through a point with a contour of the color gamut in the information-output apparatus in any tone, said point corresponding to a color in said information-input apparatus and being an endpoint acting as a point of convergence.

16. A color gamut compression apparatus according to claim 15, wherein color in said information-input apparatus which is not in the color gamut in the information-output apparatus is converted to color which corresponds to an intersection point, said intersection point being one of a plurality of intersection points, in which a coordinate value r takes a maximum value in an polar coordinate system, when the plurality of intersection points exist, said intersection points being defined by the intersection of a line with a contour of the color gamut in said information-output apparatus said line having a point of convergence acting as an endpoint and passing through a point corresponding to a color in said information-input apparatus.

17. A color gamut compression apparatus according to claim 14, wherein color in said information-input apparatus which is not in the color gamut in the information-output apparatus is converted according to three criteria, wherein a first criterion is that a target color must reside within a predetermined angular range of an angle ($\theta$, $\phi$) of a source color in a polar coordinate system of a color space, a second criterion is that the target color should be one of a plurality of colors on a contour of the color gamut produced by the information-output apparatus in any tone, and a third criterion is that the target color should be obtained by dividing by kH, kV and kc, respectively, a H axis component, a V axis component and a C axis component of a color which minimizes color difference $\Delta E$ given by Formula (1) below, wherein kH, kV and kC indicate predetermined coefficients corresponding to the H axis, the V axis and the C axis of a HVC color space, and $\Delta H$, $\Delta V$ and $\Delta C$ indicate an amount of displacement due to conversion of a color component in the H axis, the V axis and the C axis $\Delta E = \sqrt{(kH \times \Delta H^2 + kV \times \Delta V^2 + kC \times \Delta C^2)}$. (1)

18. A color gamut compression apparatus according to claim 17, wherein kH, kV and kC are set based on the relationship of Formula (2) when the maximum values NH, NV, NC of said H axis, the V axis and the C axis of the color gamut in the information-output apparatus are normalized $(kH/NH) > (10 \times kV/NV) > (10 \times kC/NC)$. (2)

19. A color gamut compression apparatus according to claim 14, wherein an intersection point of a line with a contour in the information-output apparatus in any tone is calculated by interpolation based on at least three points from a smallest value of a difference of an angle ($\phi$, $\Delta$) with the point corresponding to the color of the information-input apparatus in a polar coordinate system (r, $\phi$, $\Delta$) of a color space for a number of fixed points on a curved surface which is formed by a contour of a color gamut in the information-output apparatus in each tone, said line passing through a point corresponding to a color in an information-input apparatus and having the point of convergence as the endpoint.

20. A color gamut compression apparatus according to claim 14, wherein
when a tone of a color of an information-input apparatus is a tone comprising any of a plurality of tones of a fixed number of standard colors, said tone is taken to be a corresponding tone from said plurality of tones and a brightness of said tone is taken to be equal to a brightness of a color with the highest saturation in the color gamut of the information-output apparatus for that tone, a convergence point is taken to be a point where saturation takes a value of 0, and further wherein when a tone of a color in said information-input apparatus is an intermediate tone with respect to tones of a fixed number of standard colors, a point which is interpolated from a convergence point which corresponds to a tone of a fixed number of standard colors based on tones of colors of an information-input apparatus is taken to be the point of convergence.

21. A color gamut compression apparatus according to claim 14, wherein a vector which corresponds to a color in the information-input apparatus is defined as P, a vector which corresponds to a convergence point is defined as Po, a vector which corresponds to the intersection point of the line which passes through a point which corresponds to the vector P taking vector P as an endpoint and a curved surface which is formed on a contour of the color gamut in the information-output apparatus in each tone is taken as Ps, a vector which corresponds to the intersection point of the line and the curved surface which is formed on the contour of the color gamut of the information-input apparatus in each tone is taken to be Pt, when the above conditions exist, a color of the information-input apparatus which corresponds to the vector P is converted to a color which corresponds to vector Pc by Formula (3) when k has a value which is a fixed constant greater than 0

$$Pc = Po + (P-Po) \times |Ps-Po|/|Pt-Po| \times k$$

(when $k \times |P-Po| \leq |Ps-Po|$)

$$Pc = Ps$$

(when $k \times |P-Po| > |Ps-Po|$). (3)

22. A color gamut compression apparatus according to claim 14, wherein a conversion means is provided which converts color in the information-input apparatus which is not in the color gamut of the information-output apparatus to color inside the color gamut of the information-output apparatus and which is on a line passing through a point corresponding to a color of the information-input apparatus taking a point of convergence as an endpoint, said point of convergence is determined to one of a point at which saturation takes the value of 0, a point at an average value of the color gamut of the information-input apparatus, a point at a central value of the color gamut of the information-input apparatus, and a point at a weighted value of the color gamut of the information-input apparatus.

23. A color gamut compression apparatus according to claim 22, wherein said conversion means converts color of the information-input apparatus which is not in the color gamut of the information-output apparatus to color which corresponds to an intersection point of a line and a contour of a color gamut in the information-output apparatus in any tone, said line passing through a point which corresponds to a color of an information-input apparatus taking the point of convergence as the endpoint.

24. A color gamut compression apparatus according to claim 22, wherein a source color of an information-input apparatus which is not in the color gamut of an information-output apparatus is converted to a target color according to three criteria, the first criterion being that a target color must reside within a predetermined angular range of the angle ($\theta$, $\phi$) of a source color in a polar coordinate system (r, $\theta$, $\phi$) of a color space, the second criterion being that the target color should be one of a plurality of colors on a contour of the color gamut produced by the information-output apparatus in any tone, the third criterion being that the target color should be obtained by dividing by kH, kV and kC, respectively, the H axis component, the V axis component and the C axis component of a color which minimizes color difference $\Delta E$ given by the Formula (4) below, where kH, kV and kC indicate predetermined coefficients corresponding to the H axis, the V axis and the C axis of a HVC color space, and $\Delta H$, $\Delta V$ and $\Delta C$ indicate an amount of displacement due to conversion of a color component in the H axis, the V axis and the C axis $$\Delta E = \sqrt{(kH \times \Delta H^2 + kV \times \times V^2 + kC \times \Delta C^2)}. \quad (4)$$

25. A color gamut compression apparatus according to claim 22, wherein when a tone of a color of the information-input apparatus comprises any of a plurality of tones of a fixed number of standard colors, said tone is taken to be a corresponding tone from said plurality of tones and a brightness of said tone is taken to be equal to a brightness of a color with the highest saturation in a color gamut of an information-output apparatus for that tone, a convergence point is taken to be a point where saturation takes a value of 0, and further wherein when said tone is an intermediate tone with respect to the tones of a fixed number of standard colors, a point which is interpolated from a convergence point which corresponds to a tone of a fixed number of standard colors based on tones of colors of information-input apparatus is taken to be the point of convergence.

26. A color gamut compression apparatus according to claim 22, wherein a vector which corresponds to a color in the information-input apparatus is defined as P, a vector which corresponds to a convergence point is defined as Po, a vector which corresponds to the intersection point of the line which passes through a point which corresponds to the vector P taking vector Po as an endpoint and a curved surface which is formed on a contour of the color gamut in the information-output apparatus in each tone is taken as Ps, a vector which corresponds to the intersection point of the line and the curved surface which is formed on the contour of the color gamut of an information-input apparatus in each tone is taken to be Pt, when the above conditions hold, the color of the information-input apparatus which corresponds to the vector P is converted to a color which corresponds to the vector PC by Formula (5) below when k has a value which is a fixed constant greater than 0

$$Pc = Po + (P-Po) \times |Ps-Po|Pt-Po| \times k$$

(when $k \times |P-Po| \leq |Ps-Po|$)

$$Pc = Ps$$

(when $k \times |P-Po| > |Ps-Po|$). (5)

* * * * *